United States Patent
Tang et al.

(10) Patent No.: US 9,342,389 B2
(45) Date of Patent: May 17, 2016

(54) NEIGHBOR BASED AND DYNAMIC HOT THRESHOLD BASED HOT DATA IDENTIFICATION

(71) Applicant: SK Hynix Inc., Gyeonggi-do (KR)

(72) Inventors: Xiangyu Tang, San Jose, CA (US); Frederick K. H. Lee, Mountain View, CA (US); Jason Bellorado, San Jose, CA (US); Lingqi Zeng, Turlock, CA (US); Zheng Wu, San Jose, CA (US)

(73) Assignee: SK Hynix Inc., Gyeonggi-do (KR)

( * ) Notice: Subject to any disclaimer, the term of this patent is extended or adjusted under 35 U.S.C. 154(b) by 168 days.

(21) Appl. No.: 14/169,877

(22) Filed: Jan. 31, 2014

(65) Prior Publication Data

US 2014/0304480 A1 Oct. 9, 2014

Related U.S. Application Data

(60) Provisional application No. 61/808,529, filed on Apr. 4, 2013.

(51) Int. Cl.
| | | |
|---|---|---|
| *G06F 12/00* | (2006.01) | |
| *G06F 11/00* | (2006.01) | |
| *G06F 3/06* | (2006.01) | |
| *G06F 11/34* | (2006.01) | |
| *G06F 12/12* | (2016.01) | |

(52) U.S. Cl.
CPC ............... *G06F 11/00* (2013.01); *G06F 3/064* (2013.01); *G06F 3/0616* (2013.01); *G06F 3/0679* (2013.01); *G06F 11/3409* (2013.01); *G06F 11/3471* (2013.01); *G06F 12/121* (2013.01)

(58) Field of Classification Search
None
See application file for complete search history.

(56) References Cited

U.S. PATENT DOCUMENTS

| | | | |
|---|---|---|---|
| 6,321,240 B1 | 11/2001 | Chilimbi et al. | |
| 2006/0059474 A1* | 3/2006 | Bhansali | G06F 12/0276 717/151 |
| 2008/0282045 A1 | 11/2008 | Biswas et al. | |
| 2010/0169586 A1* | 7/2010 | Chang | G06F 12/0246 711/154 |
| 2011/0113183 A1 | 5/2011 | Lee et al. | |
| 2011/0225346 A1 | 9/2011 | Goss et al. | |
| 2011/0264843 A1 | 10/2011 | Haines et al. | |
| 2012/0297122 A1 | 11/2012 | Gorobets et al. | |
| 2013/0024609 A1* | 1/2013 | Gorobets | G06F 12/0246 711/103 |
| 2014/0013027 A1* | 1/2014 | Jannyavula Venkata | G06F 12/0866 711/103 |
| 2014/0013052 A1* | 1/2014 | Sawin | G06F 12/0862 711/122 |

FOREIGN PATENT DOCUMENTS

WO 2012158521 11/2012

OTHER PUBLICATIONS

Hsieh et al., "Efficient identification of hot data for flash memory storage systems", ACM Transactions on Storage, pp. 22-40, 2006.
(Continued)

*Primary Examiner* — Brian Peugh
(74) *Attorney, Agent, or Firm* — IP & T Group LLP

(57) ABSTRACT

An address is received. One or more neighbors associated with the received address is/are determined. One or more neighboring hot metrics is/are determined for the one or more neighbors associated with the received address. A hot metric for the received address is determined based at least in part on the neighboring hot metrics.

23 Claims, 9 Drawing Sheets

(56) References Cited

OTHER PUBLICATIONS

Park et al., "Hot Data Identification for Flash Memory Using Multiple Bloom Filters", 2010.

Tjioe et al, "Making Garbage Collection Wear Conscious for Flash SSD", 2012.

The international Preliminary Report on Patentability issued by the World Intellectual Property Organization for a PCT Appl. No. PCT/US14/14506 on Oct. 15, 2015.

* cited by examiner

NEIGHBOR BASED AND DYNAMIC HOT THRESHOLD BASED HOT DATA IDENTIFICATION

CROSS REFERENCE TO OTHER APPLICATIONS

This application claims priority to U.S. Provisional Patent Application No. 61/808,529 entitled REDUCING WRITE AMPLIFICATION AND INCREASING THROUGHPUT IN SSDS filed Apr. 4, 2013 which is incorporated herein by reference for all purposes.

BACKGROUND OF THE INVENTION

Hot data identification is a process or technique is which data is classified or identified as being either hot or cold. Hot data (generally speaking) is data that will be invalidated shortly in the future. Cold data (generally speaking) is data that will remain valid for a long time in the future. In one example application, solid state storage systems use hot data identification techniques to group hot data together and cold data together, for example when host writes are received (e.g., hot data is written to the cache whereas cold data is written to the larger but slower main drive) or during garbage collection (e.g., hot data in a block being garbage collected is written to a first new block whereas cold data in that same block is written to a second new block). Although a number of hot data identification techniques exist, improved hot data identification techniques would be desirable. Such improved techniques may (for example) improve the accuracy of hot data identification, which in turn improves the efficiency of the solid state system (e.g., by reducing write amplification, which is defined as the ratio of the number of writes to solid state storage compared to the number of host writes).

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Two hot data identification techniques are described herein. First, some examples describing various aspects of a neighbor based hot data identification technique are described. Then, examples of a hot data identification technique which uses a dynamic hot threshold are described. Finally, some examples which show both techniques being used together are described.

Figure 1:
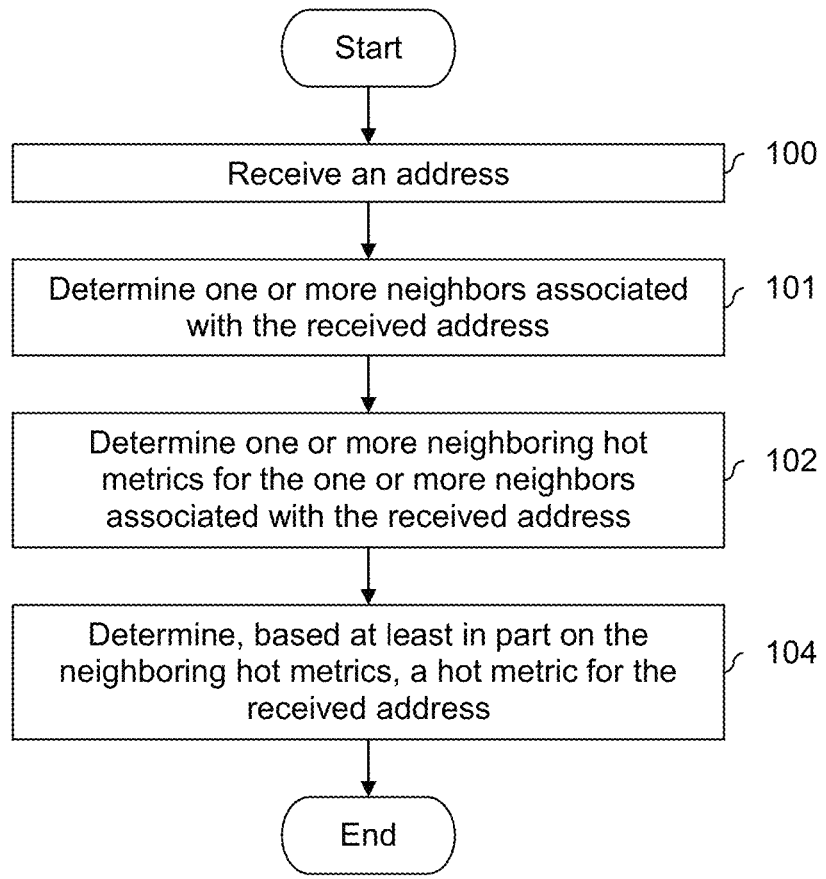
FIG. 1 is a flowchart illustrating an embodiment of a neighbor based hot data identification process.

FIG. 1 is a flowchart illustrating an embodiment of a neighbor based hot data identification process. In some embodiments, the process is performed by a storage controller in a solid state storage system. In some such embodiments, the storage controller is implemented as or using a semiconductor device, such as an application-specific integrated circuit (ASIC) or a field-programmable gate array (FPGA).

At 100, an address is received. In one example, the received address is a logical block address (LBA) in solid state storage (e.g., NAND Flash). In some embodiments, the process of FIG. 1 is performed during a host write and the address received at step 100 is associated with a host write.

At 102, one or more neighboring hot metrics are determined for one or more neighbors associated with the received address. As used herein, a neighboring hot metric refers to a metric associated with a neighbor (e.g., a neighbor of the address received at step 100). In some embodiments, the neighboring hot metrics determined at step 102 are generated on-the-fly so that the neighboring hot metrics are fresh or otherwise up to date. Any one of a variety of hot data identification techniques may be used at step 102. For example, a metric associated with the received address may be determined based on recency and/or frequency, and then that metric is compared against some hot threshold.

In some embodiments, a (neighboring) hot metric is one of two possible values: hot or cold. For example, the neighboring hot metrics determined at step 102 may be one of two values: hot (e.g., a one) or cold (e.g., a zero). In some embodiments, a (neighboring) hot metric is a score. For example, the neighboring hot metrics determined at step 102 may range in value from one (e.g., very cold) to five (e.g., very hot).

At 104, a hot metric for the received address is determined based at least in part on the neighboring hot metrics. In one example, if any of the neighboring hot metrics determined at step 102 corresponds to a hot value, then the hot metric for the received address is set to a hot value.

In one example of how a hot metric generated according to the process of FIG. 1 is used, the process of FIG. 1 may be performed by a solid state storage system (e.g., a NAND Flash storage system) during a host write. The exemplary solid state storage system includes a cache (e.g., which has quicker access times (e.g., it is faster to read from and/or write to), can tolerate more errors (e.g., compared to the non-cache portion), and can tolerate more program/erase cycles (e.g., it is more robust)). In this example, if an address (e.g., being written to during the host write) is determined by the process of FIG. 1 to be hot data, then that data is written into the cache. Conversely, if an address is determined to be cold data, then that data is written into the non-cache portion.

In some applications it may be undesirable to use neighbor based hot data identification during garbage collection. Using solid state storage as an example, solid state storage does not support in-place updates (e.g., unlike magnetic storage). For example, when old data is superseded by some new data, the old location or address (e.g., of the old data) in a page is marked as invalid and the new data is written to a new location or address in another page in the solid state storage. Over time, the number of locations in a block that are invalid will grow. To reclaim the block, the remaining valid locations are written into another block, thus freeing the entire block in solid state storage for some other use. This reclamation process is referred to as garbage collection. A block which is being garbage collected is likely to contain addresses which are cold. As such, checking neighbors may result in too many false positives during garbage collection in some solid state storage systems.

Figure 2:
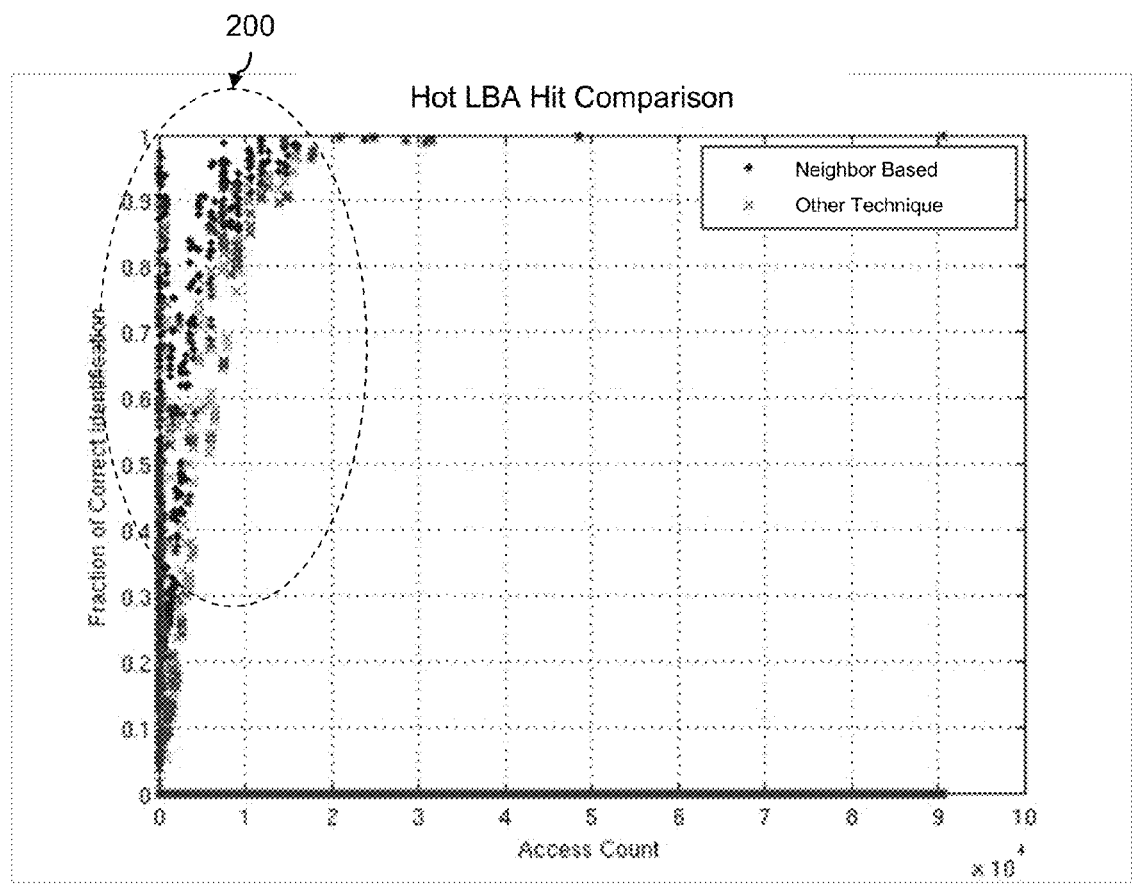
FIG. 2 is a diagram which shows exemplary simulation results comparing neighbor based hot data identification to another hot data identification technique.

A benefit to neighbor based hot data identification is that it may better detect hot data when (e.g., solid state) storage is first being written to compared to some other hot data identification techniques. For example, some other hot data identification techniques identify hot data by comparing the access count of a location (e.g., the number of times a particular LBA has been accessed in the past) against a hot threshold. If the access count is greater than the hot threshold, then the location is declared to be hot. When a location is first accessed, the access count for that location is zero and several accesses are required to reach the hotness threshold before that location is considered hot. Therefore, for the first few accesses, locations will be misidentified as cold. In contrast, neighbor based hot data identification will more quickly identify data as being hot because (at least in some embodiments) if at least one neighbor under consideration has an access count which has reached the hot threshold, then the given location will be declared hot. FIG. 2 is a diagram which shows exemplary simulation results comparing neighbor based hot data identification to another hot data identification technique. As is shown in region 200 of the graph, the neighbor based hot data identification tends to have better correct identification percentages when the access count is below ~$2\times10^4$.

Figure 3:
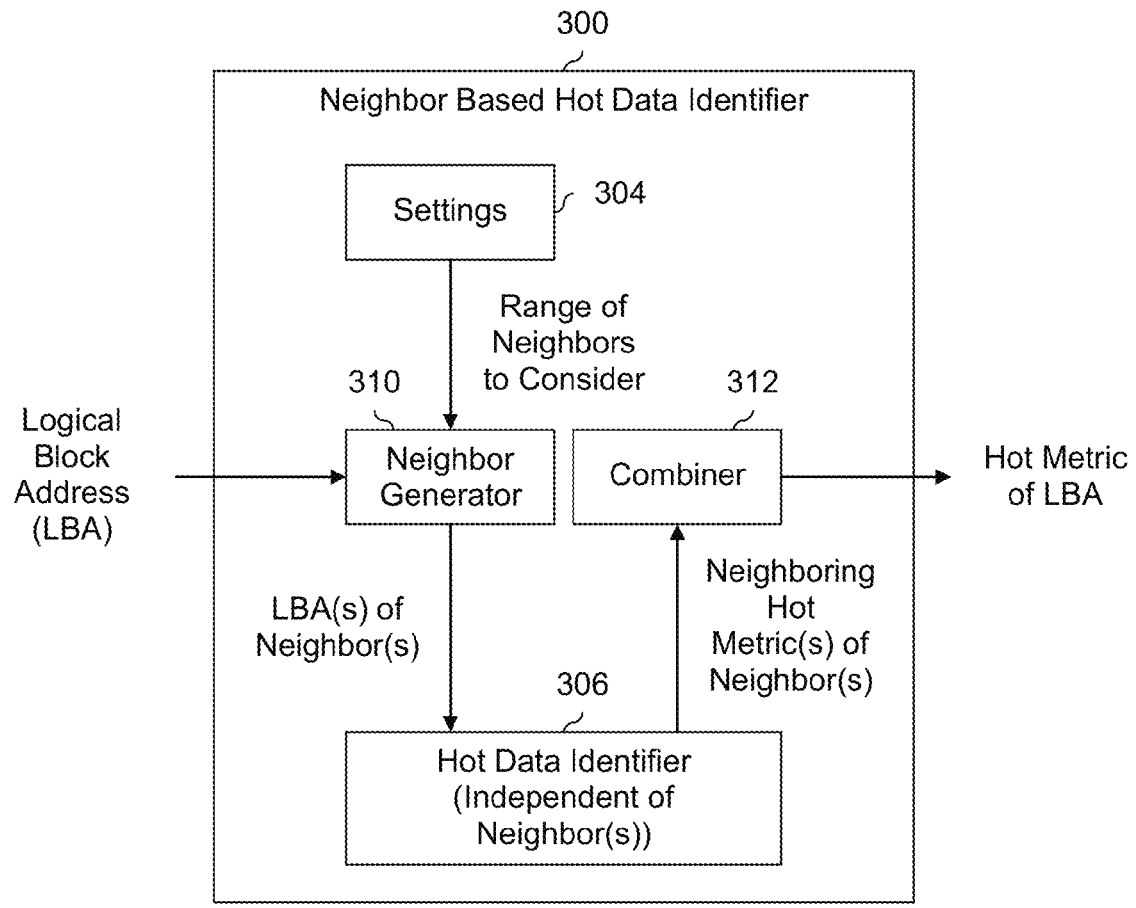
FIG. 3 is a diagram illustrating an embodiment of a system which performs neighbor based hot data identifier system.

FIG. 3 is a diagram illustrating an embodiment of a system which performs neighbor based hot data identifier system. In various embodiments, neighbor based hot data identifier 300 may be part of a storage controller (e.g., which reads from and/or writes to solid state storage media) and/or may be implemented using an ASIC or an FPGA. In some embodiments, neighbor based hot data identifier 300 is used only during a host write and is not used during garbage collection. For example, the LBA which is passed to neighbor based hot data identifier 300 may be an LBA being written to (e.g., as part of a host write). Naturally, neighbor based hot data identification techniques may be used during garbage collection in other embodiments if desired.

Neighbor generator 310 receives the LBA and obtains a range of neighbors to consider from settings 304. In one example, settings 304 is implemented as a register and the number of neighbors to consider is programmable (e.g., so that more/less neighbors are considered). Based on the range of neighbors to consider, neighbor generator 302 generates one or more LBA(s) of the neighbor(s) which are passed to hot data identifier 306.

Hot data identifier 306 generates one or more hot data metric(s) of the neighbor(s). In this particular example, hot data identifier 306 uses a hot data identifier technique which is independent of the neighbors of the LBA to be written (i.e., it does not take into consideration the hotness of a neighbor). Any appropriate technique may be employed by hot data identifier 306.

The hot metric(s) of the neighbor(s) are passed from hot data identifier 306 to combiner 312. As described above, a hot metric may either be a hot/cold value or some score over a range (e.g., a range of 1-5). In this particular example, if at least one neighbor being evaluated is hot data, then a hot metric with a hot value is output by combiner 312 (e.g., combiner 312 is an OR). If all of the neighbors have cold data, then a hot metric corresponding to a cold value is output by neighbor based hot data identifier 300. Any manner of combination may be used by combiner 312.

In some embodiments (e.g., relevant to this figure and other figures described below), the information used to generate a hot data metric is updated in real time. For example, the hot data metric being generated by neighbor based hot data identifier 300 may directly or indirectly affect a hot data metric, either for that LBA or another LBA. In one example, a generated hot metric may affect which block(s) is/are garbage collected, which in turn affects program/erase counts for the affected block(s), which in turn affects a subsequent hot metric. Or, if the received LBA is associated with a host write, then the host write may cause the program/erase count for that LBA to increment, which in turn affects a subsequent hot metric.

Figure 4:
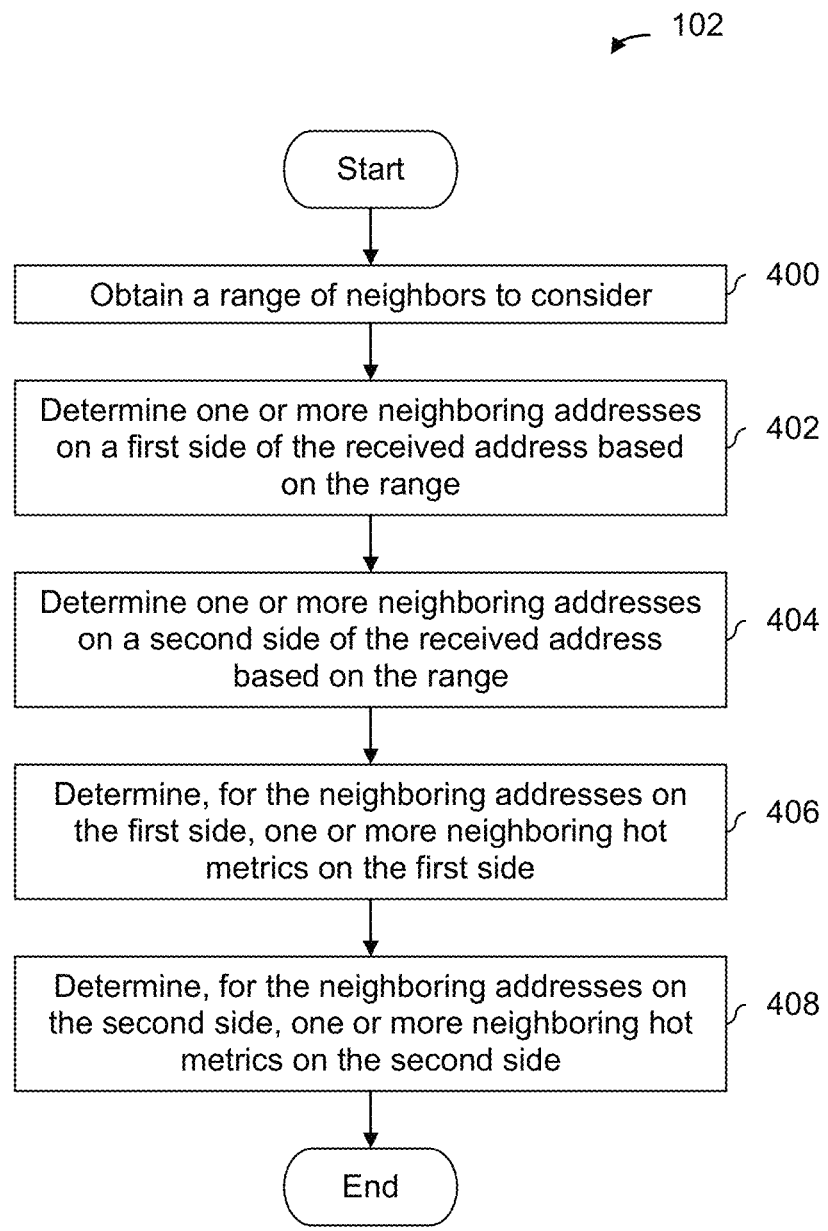
FIG. 4 is a flowchart illustrating an embodiment of a process for determining one or more neighboring hot metrics.

FIG. 4 is a flowchart illustrating an embodiment of a process for determining one or more neighboring hot metrics. In some embodiments, the process is used at step 102 in FIG. 1. In the example shown, the processing performed by neighbor based hot data identifier 300 in FIG. 3 is shown.

At 400, a range of neighbors to consider is obtained. For example, suppose n=3. At 402, one or more neighboring addresses on a first side of the received address is/are determined based on the range. In one example, if the received address is ADDR and n=3, then step 402 generates the addresses: (ADDR−3), (ADDR−2), and (ADDR−1). At 404, one or more neighboring addresses on a second side of the received address is/are determined based on the range. To continue the example from above, step 404 generates the addresses: (ADDR+1), (ADDR+2), and (ADDR+3). In FIG. 3, steps 402 and 404 are performed by controller 302.

At 406, for the neighboring addresses on the first side, one or more neighboring hot metrics on the first side is/are determined. In one example, the following neighboring hot metrics are determined: (ADDR−3)=cold, (ADDR−2)=cold, and (ADDR−1)=cold. At 408, for the neighboring addresses on the second side, one or more neighboring hot metrics on the second side is/are determined. For example, (ADDR+1)
=cold, (ADDR+2)=cold, and (ADDR+3)=hot.

Figure 5:
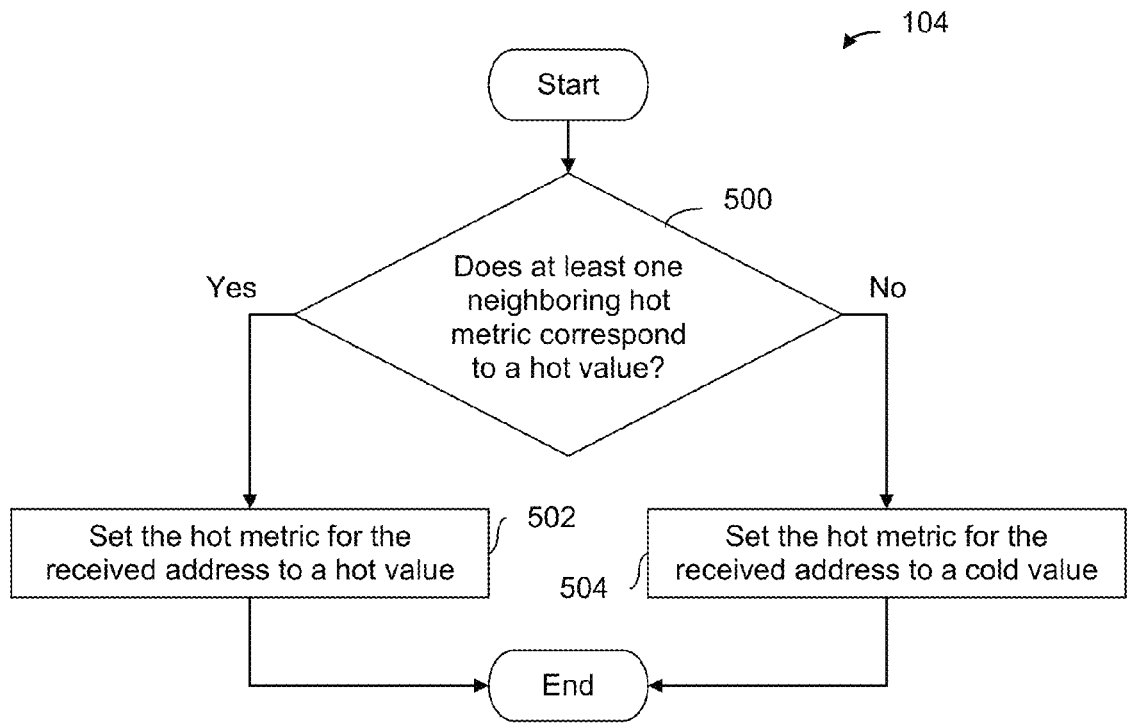
FIG. 5 is a flowchart illustrating an embodiment of a process for determining a hot metric using neighboring hot metrics.

FIG. 5 is a flowchart illustrating an embodiment of a process for determining a hot metric using neighboring hot metrics. In some embodiments, the process is used at step 104 in FIG. 1. In the example shown, the processing performed by neighbor based hot data identifier 300 in FIG. 3 is shown. At 500, it is determined if at least one neighboring hot metric corresponds to a hot value. If so, the hot metric for the received address is set to a hot value at 502. If not, at 504, the hot metric for the received address is set to a cold value.

If the example above were processed according to FIG. 5, the hot metric for the received address would be set to a hot value because the neighbor (LBA+3) has a neighboring hot metric which corresponds to a hot value.

The following figures describe some examples of a hot data identification technique which uses a dynamic hot threshold. In some embodiments, the technique is used during a host write. In some embodiments, the technique is used during garbage collection.

Figure 6:
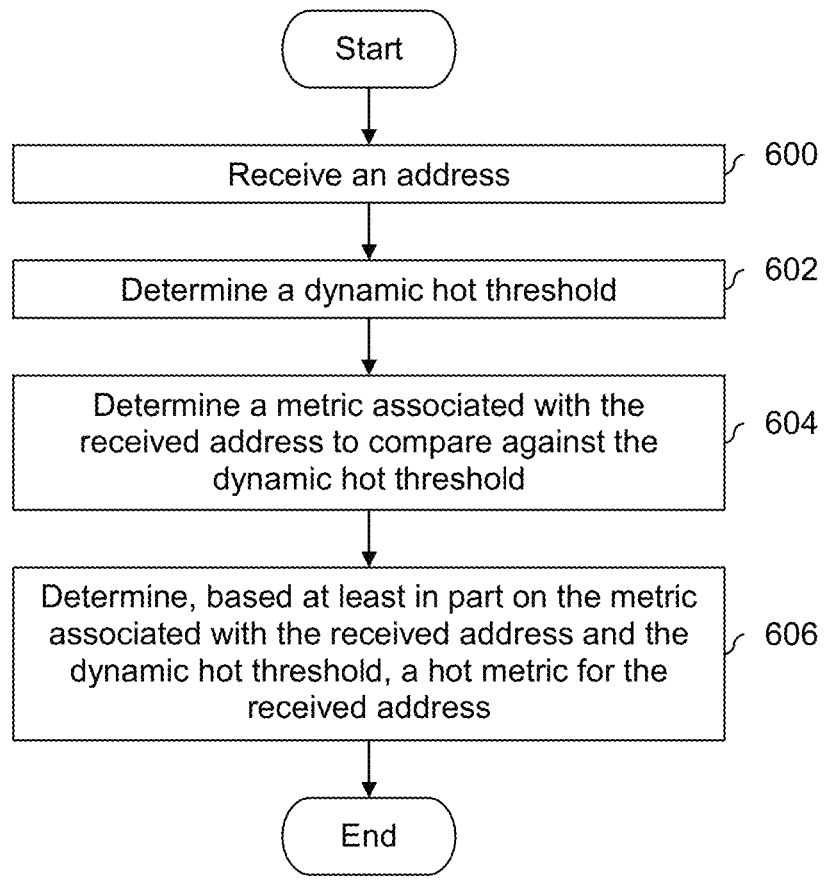
FIG. 6 is a flowchart illustrating an embodiment of a dynamic hot threshold based hot data identification process.

FIG. 6 is a flowchart illustrating an embodiment of a dynamic hot threshold based hot data identification process. In some embodiments, the process is performed by a storage controller in a solid state storage system. In some such embodiments, the storage controller is implemented as or using a semiconductor device, such as an application-specific integrated circuit (ASIC) or a field-programmable gate array (FPGA).

At 600, an address is received. For example, the address may be an LBA within a block of a solid state storage system. In some embodiments, the received address is associated with a host write. In some embodiments, the received address is associated with garbage collection (e.g., it is the address of valid data within a block that also includes invalid data).

At 602, a dynamic hot threshold is determined. Unlike a static hot threshold, a dynamic hot threshold changes over time, for example as the state of the solid state storage system changes. In some embodiments, a dynamic hot threshold is determined based on one or more of the following: an average access count in a block of interest ($C_{avg}$), a measure of fullness of a cache associated with solid state storage (f), or some measure of wear leveling associated with the solid state storage (e.g., a wear leveling difference, the wear leveling of the entire solid state storage, the wear leveling of a specific portion of the solid state storage, etc.).

In some embodiments, a single dynamic hot threshold is determined for the entire solid state storage drive (which may include multiple solid state die). In some applications, the storage controller cannot control where logical block addresses are stored. For example, logical block addresses can move from die to die with each garbage collection.

At 604, a metric associated with the received address to compare against the dynamic hot threshold is determined. Any appropriate technique may be used to determine the metric at step 604. In some embodiments, the metric determined at step 604 is based on recency (e.g., tracked using a timestamp associated with a last write to that address) as well as frequency (e.g., tracked using access count). For example, an address which is written both frequently and recently is considered hot, but an address which is written frequently but in the distant past or an address that was written recently but infrequently is considered cold. Similarly, an address which was written neither frequently nor recently would also be considered cold.

At 606, a hot metric for the received address is determined based at least in part on the metric associated with the received address and the dynamic hot threshold. Using a dynamic hot threshold at step 606 enables a system to generate hot metrics which adapt to different usage patterns. For example, different users can have different usage patterns, and even the same user can have different usage patterns over time. In addition to or as an alternative to usage patterns, a dynamic hot threshold enables a system to adapt to the condition of the solid state storage itself, which varies over time. For these reasons, a hot metric which is determined using a dynamic hot threshold is desirable.

Figure 7:
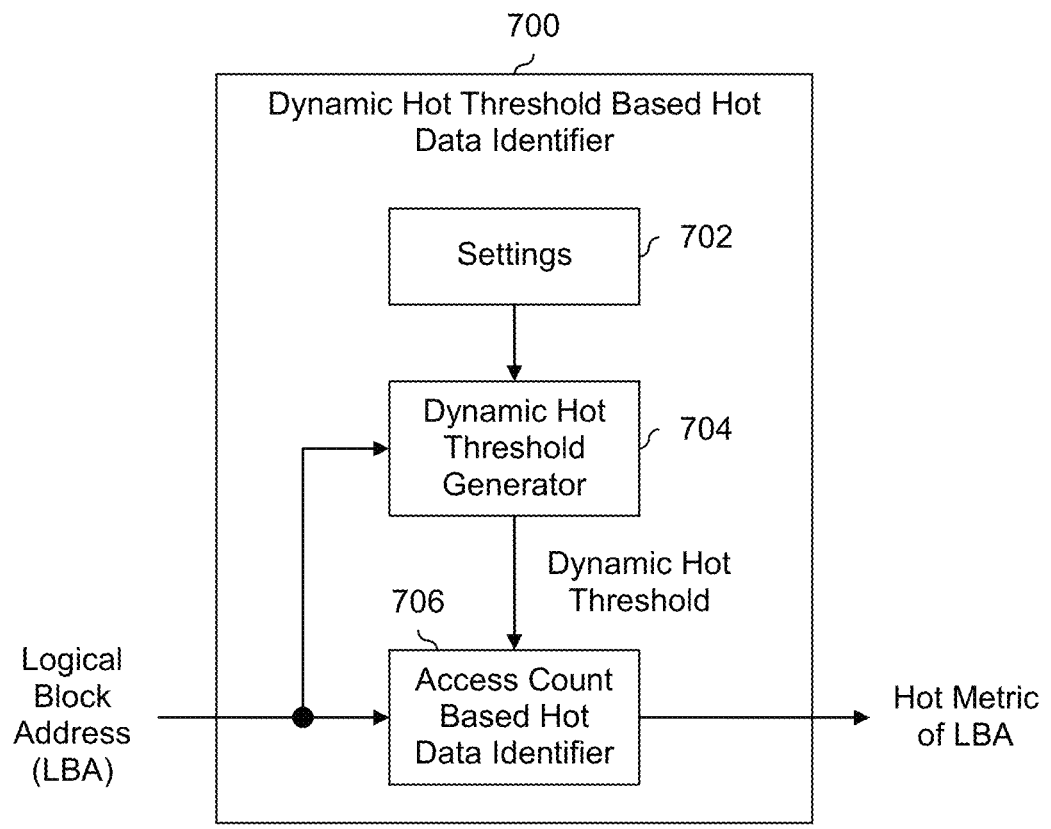
FIG. 7 is a diagram illustrating an embodiment of a system which performs dynamic hot threshold based hot data identification.

FIG. 7 is a diagram illustrating an embodiment of a system which performs dynamic hot threshold based hot data identification. In the example shown, an LBA is input to dynamic hot threshold based hot data identifier 700. For example, the LBA may be an address associated with a host write, or an address which is associated with garbage collection (e.g., it is an address within a block being garbage collected).

In this example, access count based hot data identifier 706 (e.g., internally) generates an access count for the received LBA. Access count based hot data identifier 706 may use any appropriate technique to track and/or determine access counts for a given LBA. The access count is compared by access count based hot data identifier 706 against a dynamic hot threshold which is generated by dynamic hot threshold generator 704 (described in further detail below). In this example, if the access count is less than the dynamic hot threshold, then a hot metric having a cold value is output for the received LBA. If the access count is greater than the dynamic hot threshold, then a hot metric having a hot value is output for the received LBA. As described above, the hot metric output by dynamic hot threshold based hot data identifier 700 may be either a hot/cold value or a value which spans a range of values (e.g., a range of 1-5).

Dynamic hot threshold generator 704 uses the incoming traffic (in the form of LBAs in FIG. 7) to adjust the dynamic hot threshold. This is because two identical solid state storage systems may be used in very different manners and depending on the usage, different hot thresholds will result. Dynamic hot threshold generator 704 also uses any number of settings 702. For example, the settings may specify values of constants used to generate the dynamic hot threshold and/or what system or state information to use in generating the dynamic hot threshold. In some embodiments, the settings used by dynamic hot threshold generator 704 begin with default or initial values and are adjusted over time as the actual usage pattern of the solid state storage system becomes more apparent.

In some embodiments, dynamic hot threshold generator 704 generates a dynamic hot threshold using $C_{avg}$, which is an average access count of LBAs in a block of interest (e.g., a block being garbage collected or the block being written to during a host write). For example, the dynamic hot threshold (T) may be $T(C_{avg})=1.2C_{avg}$. In general, as the cache becomes full (i.e., as f increases), the dynamic hot threshold increases. This has the effect of causing more data to be classified as cold data and stored in the non-cache portion of the solid state storage as opposed to the cache.

In some embodiments, dynamic hot threshold generator 704 generates a dynamic hot threshold using f, which is a measure of fullness of a cache associated with solid state storage, that is, T(f). As the cache sustains more wear compared to the rest of the solid state storage (i.e., as $w_{diff}$ increases), the dynamic hot threshold increases. In such cases it is desirable to store more data in the non-cache portion of the solid state storage since the cache is getting worn out faster than the rest of the solid state storage.

In some embodiments, dynamic hot threshold generator 704 generates a dynamic hot threshold using $w_{diff}$, which is a difference between the wear level of a cache ($w_{cache}$) and the wear level of a non-cache portion of the solid state storage (w). In other words, $T(w_{diff})$. This enables the dynamic hot threshold to adapt to different usage patterns using the average access count ($C_{avg}$). For example, as the average access count increases, the dynamic hot threshold increases. It does not make sense, for example, to have the same hot threshold for solid state storage systems which experience (e.g., radically) different usage patterns.

To illustrate exemplary values, $C_{avg}$ may be some non-negative real number, f may be a number between zero and one (e.g., where zero means that the cache is empty and one means that the cache is full), and $w_{diff}$, $w_{cache}$, and w may be numbers between zero and one (e.g., where one indicates 100% of a maximum number of program/erase cycles and zero indicates 0% of a maximum number of program/erase cycles).

In addition to the variables described above, any number of constants and/or configurations which affect dynamic hot threshold generation may be obtained from settings 702. For example, the dynamic hot threshold (T) may be calculated using:

$$T(C_{avg}, f, w_{diff}) = k_1 C_{avg} \exp(k_2(f-f_k) + k_3(w_{diff}-w_k)),$$

where $k_1$, $k_2$, $k_3$, $f_k$, and $w_k$ are constants which are set as desired and are obtained from settings 702.

Access count based hot data identifier 706 is merely exemplary and is not intended to be limiting. Any appropriate hot data identification technique which uses a threshold may be used in combination with the dynamic hot threshold technique described herein.

In some embodiments, a dynamic hot threshold is used in combination with neighbor based hot data identification. The following figures show some examples of this.

Figure 8:
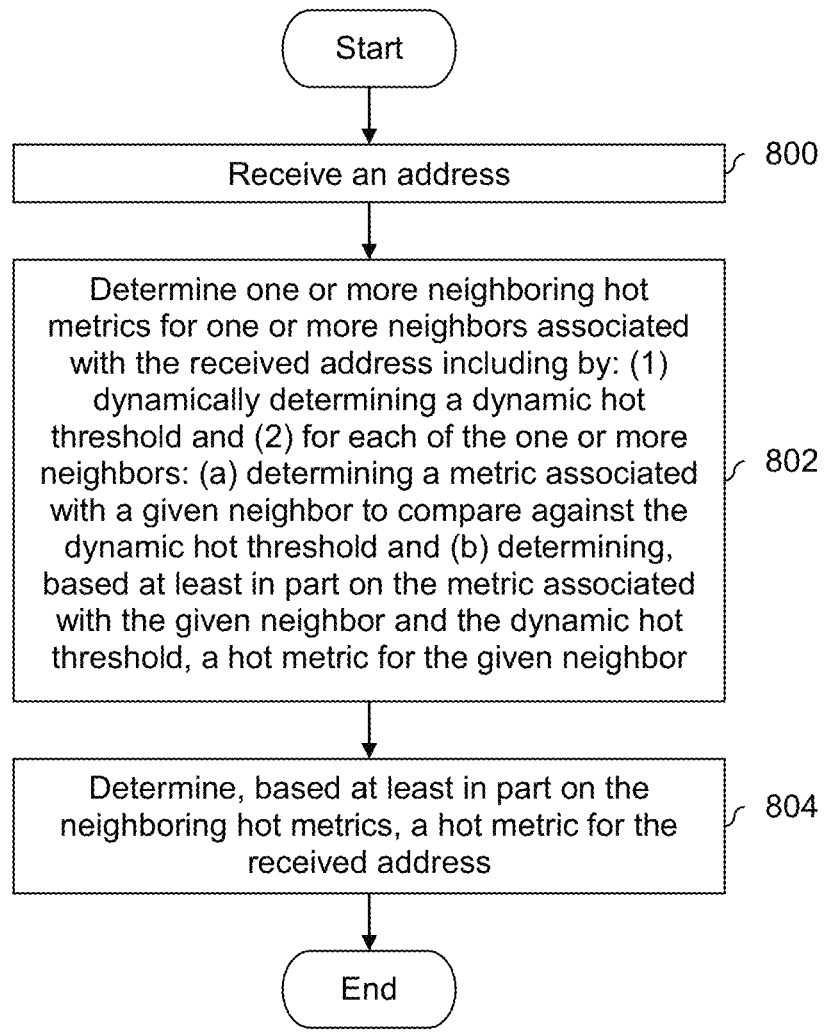
FIG. 8 is a flowchart illustrating an embodiment of a process for identifying hot data based on neighbors and using a dynamic hot threshold.

FIG. 8 is a flowchart illustrating an embodiment of a process for identifying hot data based on neighbors and using a dynamic hot threshold. At 800, an address is received. As described above, in various embodiments a received address may be associated with a host write or with garbage collection.

At 802, one or more neighboring hot metrics for one or more neighbors associated with the received address is/are determined, including by: (1) determining a dynamic hot threshold and (2) for each of the one or more neighbors: (a) determining a metric associated with a given neighbor to compare against the dynamic hot threshold and (b) determining, based at least in part on the metric associated with the given neighbor and the dynamic hot threshold, a hot metric for the given neighbor. In other words, one or more neighboring hot metrics are determined where each neighboring hot metric is determined using a dynamic hot metric that changes over time (e.g., as the state and/or usage of a solid state storage system changes).

At 804, a hot metric for the received address is determined based at least in part on the neighboring hot metrics. For example, if at least one neighboring hot metric corresponds to a hot value, then the hot metric for the received address is set to a hot value.

Figure 9:
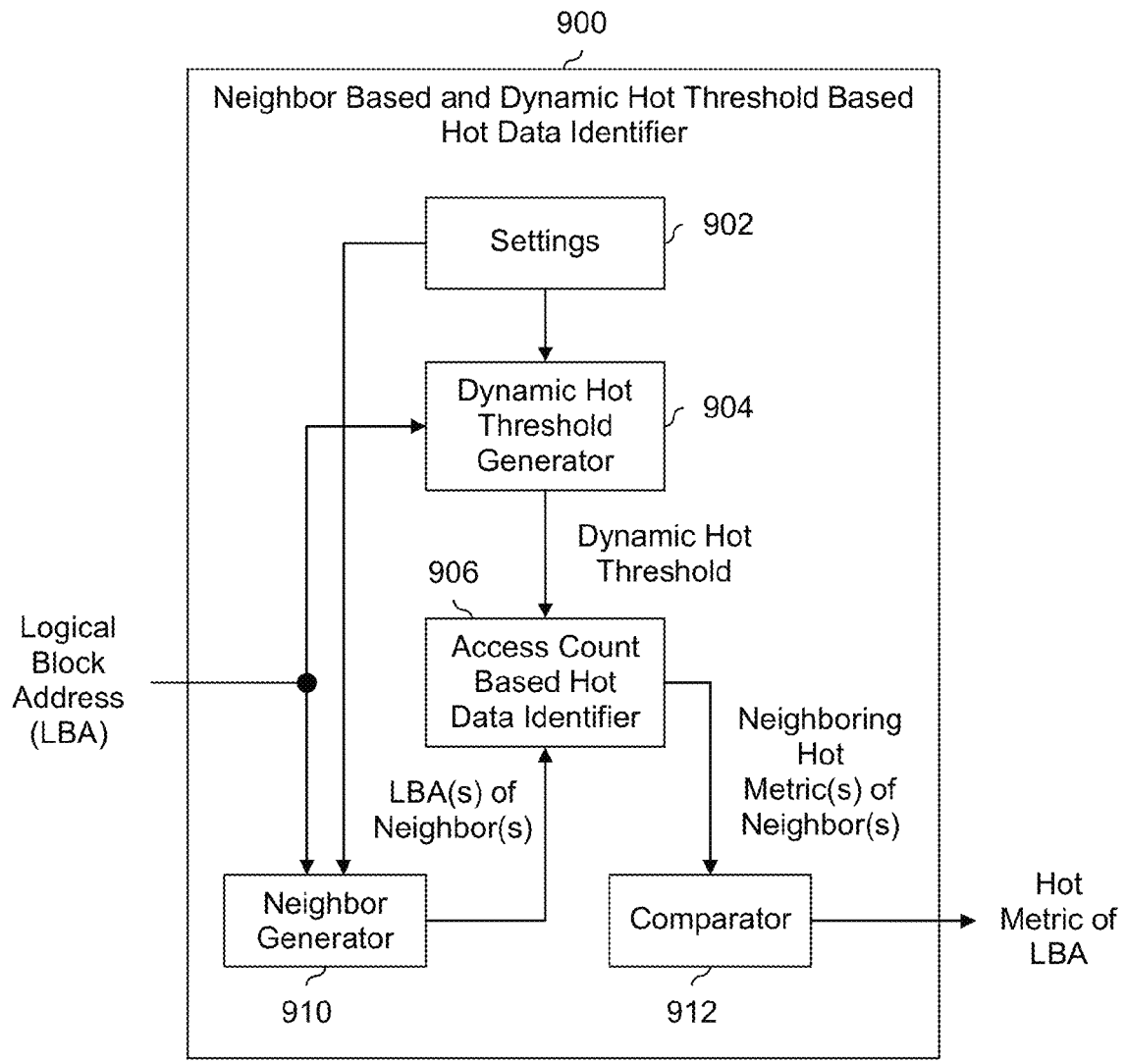
FIG. 9 is a diagram illustrating an embodiment of a system which performs neighbor based and dynamic hot threshold based hot data identification.

FIG. 9 is a diagram illustrating an embodiment of a system which performs neighbor based and dynamic hot threshold based hot data identification. In the example shown, an LBA is received by neighbor based and dynamic hot threshold based hot data identifier 900. The received address is passed to dynamic hot threshold generator 904 and neighbor generator 910 in neighbor based and dynamic hot threshold based hot data identifier 900.

Using any number of parameters or settings from settings 902 and the received LBA, dynamic hot threshold generator 904 generates a dynamic hot threshold which is passed to access count based hot data identifier 906. Neighbor generator 908 generates one or more LBAs for one or more neighbors of the specified LBA using the received LBA and any number of settings or parameters from settings 902. The LBA(s) of the neighbors are passed from neighbor generator 910 to access count based hot data identifier 906.

Access count based hot data identifier 906 generates a metric (for each neighbor) to compare against the dynamic hot threshold and sends one or more neighboring hot metrics of the neighbors to comparator 912 based on the comparison. In some embodiments, if at least one neighboring hot metric corresponds to a hot value, then the hot metric of the LBA which is output is set to a hot value (e.g., comparator 912 is an OR).

The following table illustrates the performance improvement, as measured by write amplification of the various hot data identification techniques described herein. Write amplification is defined as the ratio of the total number of (e.g., actual) writes to solid state storage compared to the number of host writes (e.g., which triggered the actual writes). For example, if a host writes one LBA and in doing so causes a garbage collection process to conduct one extra or additional write in addition to the host write, the write amplification is two. Write amplification is a useful parameter because reducing write amplification is an important aspect of solid state storage management. A large write amplification value increases the amount of time to perform a host write, which is undesirable. Also, since solid state storage can only last for a limited number of write cycles, reducing write amplification can prolong the life of the solid state storage system.

In the table below, the neighbor based hot data identification techniques (i.e., the last two rows) utilize a value of n=3 (i.e., three neighbors on each side of the LBA of interest are considered). For the dynamic hot threshold techniques (i.e., the third row and last row), the threshold function used is $T(C_{avg}) = 1.2 C_{avg}$.

TABLE 1

Comparison of Write Amplification Values for Various Hot Data Identification Techniques

| Hot Data Identification Technique | Write Amplification |
|---|---|
| None | 6.1 |
| Some Other Hot Data Identification Technique | 5.01 |
| Dynamic Hot Threshold Based | 4.74 |
| Neighbor Based | 4.65 |
| Both Dynamic Hot Threshold Based and Neighbor Based | 4.55 |

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
a memory with a cache portion and a non-cache portion;
a neighbor generator configured to:
  receive an address; and
  determine one or more neighbors associated with the received address;

a hot data identifier configured to determine one or more neighboring hot metrics for the one or more neighbors associated with the received address; and
a comparator configured to determine, based at least in part on the neighboring hot metrics, a hot metric for the received address,
wherein the received address is written to the cache portion of the memory when the determined hot metric for the received address corresponds to a hot data value.

2. The system of claim 1, wherein the received address is associated with a host write.

3. The system of claim 1, wherein the received address is associated with garbage collection.

4. The system of claim 1, wherein the hot data identifier is configured to determine the neighboring hot metrics, including by:
obtaining a range of neighbors to consider;
determining one or more neighboring addresses on a first side of the received address based on the range;
determining one or more neighboring addresses on a second side of the received address based on the range;
determining, for the neighboring addresses on the first side, one or more neighboring hot metrics on the first side; and
determining, for the neighboring addresses on the second side, one or more neighboring hot metrics on the second side.

5. The system of claim 1, wherein the comparator is configured to determine the hot metric for the received address, including by:
determining if at least one neighboring hot metric corresponds to a hot value;
in the event it is determined that at least one neighboring hot metric corresponds to the hot value, setting the hot metric for the received address to the hot data value; and
in the event it is determined that at least one neighboring hot metric does not correspond to the hot value, setting the hot metric for the received address to a cold data value.

6. The system of claim 1, wherein the hot data identifier is configured to determine the neighboring hot metrics, including by:
determining a dynamic hot threshold; and
for each of the one or more neighbors:
determining a metric associated with a given neighbor to compare against the dynamic hot threshold; and
determining, based at least in part on the metric associated with the given neighbor and the dynamic hot threshold, a hot metric for the given neighbor.

7. The system of claim 6, wherein the hot data identifier is configured to determine the dynamic hot threshold, including by determining the dynamic hot threshold using an average access count of logical block addresses (LBAs) in a block of interest.

8. The system of claim 6, wherein the hot data identifier is configured to determine the dynamic hot threshold, including by determining the dynamic hot threshold using a measure of fullness of the cache portion of the memory.

9. The system of claim 6, wherein the hot data identifier is configured to determine the dynamic hot threshold, including by determining the dynamic hot threshold using a difference between a wear level of the cache portion and a wear level of the non-cache portion of the memory.

10. A system, comprising:
a memory including a cache portion and a non-cache portion;
a dynamic hot threshold generator configured to determine a dynamic hot threshold; and
a hot data identifier configured to:
receive an address;
determine a metric associated with the received address to compare against the dynamic hot threshold; and
determine, based at least in part on the metric associated with the received address and the dynamic hot threshold, a hot metric for the received address,
wherein the received address is written to the cache portion of the memory when the determined hot metric for the received address corresponds to a hot data value.

11. The system of claim 10, wherein the received address is associated with a host write.

12. The system of claim 10, wherein the received address is associated with garbage collection.

13. The system of claim 10, wherein the hot data identifier is configured to determine the dynamic hot threshold including by determining the dynamic hot threshold using an average access count of logical block addresses (LBAs) in a block of interest.

14. The system of claim 10, wherein the hot data identifier is configured to determine the dynamic hot threshold including by determining the dynamic hot threshold using a measure of fullness of the cache portion of the memory.

15. The system of claim 10, wherein the hot data identifier is configured to determine the dynamic hot threshold including by determining the dynamic hot threshold using a difference between a wear level of the cache portion and the wear level of the non-cache portion of the memory.

16. A method, comprising:
receiving an address;
determining one or more neighbors associated with the received address;
using a processor to determine one or more neighboring hot metrics for the one or more neighbors associated with the received address;
determining, based at least in part on the neighboring hot metrics, a hot metric for the received address; and
writing the received address to a cache portion of a memory when the determined hot metric for the received address corresponds to a hot data value.

17. The method of claim 16, wherein using the processor to determine the neighboring hot metrics includes:
obtaining a range of neighbors to consider;
determining one or more neighboring addresses on a first side of the received address based on the range;
determining one or more neighboring addresses on a second side of the received address based on the range;
determining, for the neighboring addresses on the first side, one or more neighboring hot metrics on the first side; and
determining, for the neighboring addresses on the second side, one or more neighboring hot metrics on the second side.

18. The method of claim 16, wherein determining the hot metric for the received address includes:
determining if at least one neighboring hot metric corresponds to a hot value;
in the event it is determined that at least one neighboring hot metric corresponds to the hot value, setting the hot metric for the received address to the hot data value; and
in the event it is determined that at least one neighboring hot metric does not correspond to the hot value, setting the hot metric for the received address to a cold data value.

19. The method of claim 16, wherein using the processor to determine the neighboring hot metrics includes:
determining a dynamic hot threshold; and for each of the one or more neighbors:
  determining a metric associated with a given neighbor to compare against the dynamic hot threshold; and
  determining, based at least in part on the metric associated with the given neighbor and the dynamic hot threshold, a hot metric for the given neighbor.

20. A method, comprising:
using a processor to determine a dynamic hot threshold; and
receiving an address;
determining a metric associated with the received address to compare against the dynamic hot threshold;
determining, based at least in part on the metric associated with the received address and the dynamic hot threshold, a hot metric for the received address; and
writing the received address to a cache portion of a memory when the determined hot metric for the received address corresponds to a hot data value.

21. The method of claim 20, wherein using the processor to determine the dynamic hot threshold includes determining the dynamic hot threshold using an average access count of logical block addresses (LBAs) in a block of interest.

22. The method of claim 20, wherein using the processor to determine the dynamic hot threshold includes determining the dynamic hot threshold using a measure of fullness of the cache portion of the memory.

23. The method of claim 20, wherein using the processor to determine the dynamic hot threshold includes determining the dynamic hot threshold using a difference between a wear level of the cache portion and a wear level of a non-cache portion of the memory.

* * * * *